(12) United States Patent
Inoue et al.

(10) Patent No.: US 12,131,257 B2
(45) Date of Patent: Oct. 29, 2024

(54) SOUND ANOMALY DETECTION WITH MIXED AUGMENTED DATASETS

(71) Applicant: INTERNATIONAL BUSINESS MACHINES CORPORATION, Armonk, NY (US)

(72) Inventors: Tadanobu Inoue, Yokohama (JP); Shu Morikuni, Koutouku (JP); Michiaki Tatsubori, Oiso (JP); Ryuki Tachibana, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 801 days.

(21) Appl. No.: 17/329,611

(22) Filed: May 25, 2021

(65) Prior Publication Data

US 2022/0383090 A1    Dec. 1, 2022

(51) Int. Cl.
*G06N 3/08*    (2023.01)
*G06F 18/211*    (2023.01)
(Continued)

(52) U.S. Cl.
CPC .............. *G06N 3/08* (2013.01); *G06F 18/211* (2023.01); *G06F 18/214* (2023.01); *G06V 10/751* (2022.01)

(58) Field of Classification Search
CPC ........ G06N 3/08; G06N 3/0464; G06N 3/084; G06N 3/094; G06F 18/10; G06F 18/211;
(Continued)

(56) References Cited

U.S. PATENT DOCUMENTS

2017/0200092 A1* 7/2017 Kisilev .................. G06N 3/08
2018/0248905 A1* 8/2018 Côté .................... G06N 3/08
(Continued)

FOREIGN PATENT DOCUMENTS

CN        111354366 A    6/2020

OTHER PUBLICATIONS

Liron Bergman, Yedid Hoshen, "Classification-Based Anomaly Detection for General Data", May 5, 2020 on arXiv, ICLR 2020 (Year: 2020).*

(Continued)

*Primary Examiner* — Hope C Sheffield
(74) *Attorney, Agent, or Firm* — Tutunjian & Bitetto, P.C.; Robert Richard Aragona

(57) ABSTRACT

Methods and computer program products for training a neural network perform multiple forms of data augmentation on sample waveforms of a training dataset that includes both normal and abnormal samples to generate normal data augmentation samples and abnormal data augmentation samples. The normal data augmentation samples are labeled according to a type of data augmentation that was performed on each respective normal data augmentation sample. The abnormal data augmentation samples are labeled according to a type of data augmentation other than that which was performed on each respective abnormal data augmentation sample. A neural network model is trained to identify a form of data augmentation that has been performed on a waveform using the normal data augmentation samples and the abnormal data augmentation samples.

20 Claims, 9 Drawing Sheets

(51) Int. Cl.
    *G06F 18/214*  (2023.01)
    *G06V 10/75*  (2022.01)
(58) Field of Classification Search
    CPC .............. G06F 18/214; G06F 18/2413; G06F
            18/2433; G06F 18/254; G06V 10/751;
            G10L 15/08; G10L 15/063; G10L 15/16;
            G10L 21/057; G10L 2015/0635
    USPC .......................................................... 706/15
    See application file for complete search history.

(56) References Cited

U.S. PATENT DOCUMENTS

| | | | |
|---|---|---|---|
| 2019/0370662 A1 | 12/2019 | Song | |
| 2020/0020329 A1* | 1/2020 | Gordon | ................... G10L 25/51 |
| 2020/0110994 A1* | 4/2020 | Goto | ...................... G06N 3/044 |
| 2020/0364616 A1* | 11/2020 | Wong | ................... G06F 16/285 |

OTHER PUBLICATIONS

Ruff, Lukas, et al., "Deep One-Class Classification", InInternational conference on machine learning, PMLR. Jul. 3, 2018, pp. 1-10.
Ruff, Lukas, et al., "Deep Semi-supervised Anomaly Detection", arXiv preprint arXiv:1906.02694, ICLR 2020. Feb. 14, 2020, pp. 1-23.
Inoue, Tadanobu, et al., "Detection of Anomalous Sounds for Machine Condition Monitoring using Classification Confidence", Tech. report in Detection and Classification of Acoustic Scenes and Events (DCASE) 2020 Challenge Task. Nov. 2020, pp. 66-70.
Salamon, Justin, et al., "Deep Convolutional Neural Networks and Data Augmentation for Environmental Sound Classification", IEEE Signal Processing Letters. Jan. 23, 2017, pp. 1-5.
Giri, Ritwik, et al., "Self-supervised Classification for Detecting Anomalous Sounds" InDetection and Classification pf Acoustic Scenes and Events Workshop (DCASE) 2020. Nov. 2020, pp. 1-5.
Koizumi, Yuma, et al., "Unsupervised Detection of Anomalous Sound Based on Deep Learning and the Neyman-Pearson Lemma", IEEE/ACM Transactions on Audio, Speech, and Language Processing, vol. 27, No. 1. Jan. 2019, pp. 212-224.
Mell et al., "The NIST Definition of Cloud Computing", National Institute of Standards and Technology, Special Publication 800-145, Sep. 2011, pp. 1-7.
Grace Period Disclosure: Inoue et al., "Detection of Anomalous Sounds for Machine Condition Monitoring Using Classification Confidence", Detection of Classification of Acoustic Scenes and Events. (Technical Report.) Jul. 1, 2020. pp. 1-4.
Grace Period Disclosure: Inoue et al., "Detection of Anomalous Sounds for Machine Condition Monitoring Using Classification Confidence", (paper) DCASE2020. Detection of Classification of Acoustic Scenes and Events, 2020. Nov. 2, 2020. pp. 1-5.
Grace Period Disclosure: Inoue et al., "Detection of Anomalous Sounds for Machine Condition Monitoring Using Classification Confidence", (presentation) DCASE2020 Workshop: Detection of Classification of Acoustic Scenes and Events. Nov. 2, 2020. pp. 1-20.

* cited by examiner

SOUND ANOMALY DETECTION WITH MIXED AUGMENTED DATASETS

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S)

DETECTION OF ANOMALOUS SOUNDS FOR MACHINE CONDITION MONITORING USING CLASSIFICATION CONFIDENCE, Tadanobu Inoue, Phongtharin Vinayavekhin, Shu Morikuni, Shiqiang Wang, Tuan Hoang Trong, David Wood, Michiaki Tatsubori, Ryuki Tachibana, made available Jul. 1, 2020.
DETECTION OF ANOMALOUS SOUNDS FOR MACHINE CONDITION MONITORING USING CLASSIFICATION CONFIDENCE (paper), T. Inoue, P. Vinayavekhin, S. Morikuni, S. Wang, T. H. Trong, D. Wood, M. Tatsubori, R. Tachibana, made available Nov. 2, 2020.
DETECTION OF ANOMALOUS SOUNDS FOR MACHINE CONDITION MONITORING USING CLASSIFICATION CONFIDENCE (presentation), Tadanobu Inoue, Phongtharin Vinayavekhin, Shu Morikuni, Shiqiang Wang, Tuan Hoang Trong, David Wood, Michiaki Tatsubori, Ryuki Tachibana, made available Nov. 2, 2020.

BACKGROUND

The present invention generally relates to detection of anomalies in sound data, and, more particularly, to using data augmentation on sound samples to distinguish anomalous sound data from normal sound data.

Anomaly detection seeks to find unusual samples in audio data. For example, using a dataset of audio samples that represent "normal" data for training a model, anomalous input audio data may be recognized with the trained model. Examples of attempts at performing audio anomaly detection include reconstruction, where anomalies may be detected from reconstruction errors of a trained autoencoder or generative adversarial network, feature-learning, where a feature extraction model maps normal data into a small area of a feature space, classification, where a classifier is used to find samples that are out of an expected distribution, and geometric transformation, where a classifier is trained to infer geometric transformations of image data.

Each of these examples faces respective challenges. Geometric transformation, for example, is designed for images, and a naïve application of geometric transformation principles to audio samples performs poorly.

SUMMARY

A computer program product for training a neural network performs multiple forms of data augmentation on sample waveforms of a training dataset that includes both normal and abnormal samples to generate normal data augmentation samples and abnormal data augmentation samples. The normal data augmentation samples are labeled according to a type of data augmentation that was performed on each respective normal data augmentation sample. The abnormal data augmentation samples are labeled according to a type of data augmentation other than that which was performed on each respective abnormal data augmentation sample. A neural network model is trained to identify a form of data augmentation that has been performed on a waveform using the normal data augmentation samples and the abnormal data augmentation samples.

A computer program product for training a neural network performs multiple forms of data augmentation on sample waveforms of a training dataset that includes both normal and abnormal samples to generate normal data augmentation samples and abnormal data augmentation samples. A neural network model is trained to identify a form of data augmentation that has been performed on a waveform using the normal data augmentation samples and the abnormal data augmentation samples. The abnormal data augmentation samples contribute to a training loss function differently as compared to the normal data augmentation samples.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

To detect anomalous sound data, sound augmentation may be used on an acoustic dataset, using a variety of different augmentation types. A machine learning model may then be trained to classify input sound segments according to what kind of data augmentation was applied. During anomaly detection, input sound data is augmented in the same fashion as the training dataset. The machine learning model is then used to classify the input sound data in accordance with the different kinds of data augmentation. An anomaly score can then be generated, on the basis of a confidence with which the augmented input data is classified to trained augmentation type classes. Anomalous sound data may generally have a lower confidence value and higher anomaly score than normal sound data.

To further increase the efficacy of this model, a training dataset is formed with a combination of samples from normal operation and samples from abnormal operation. The abnormal samples are augmented in such a way as to provide intentionally incorrect labels for the augmentation that is performed. The number of abnormal samples in the training dataset may be relatively small, compared to the number of normal samples. In many cases, the number of samples from abnormal operation for training dataset is small enough that naïve binary classification performs poorly.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
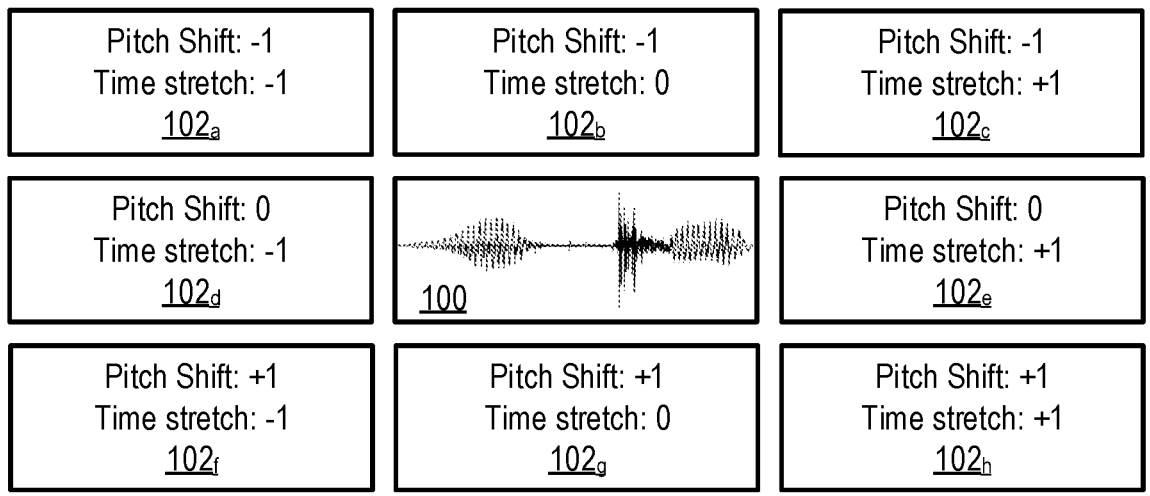
FIG. 1 is a diagram showing a variety of different forms of data augmentation being performed on an input waveform sample, including distinct types of data augmentation that are performed to differing degrees, in accordance with an embodiment of the present invention.

Referring now to FIG. 1, a diagram is shown that illustrates the application of a variety of different data augmentation processes to a sound clip 100. In this example, two kinds of data augmentation are performed to create multiple augmented samples. This particular example shows a pitch shift and a time stretch being performed, each to three different degrees. Thus, nine samples are shown, including the original input sample 100, and eight augmented samples $102_a$-$102_h$, each with a different respective degree (e.g., a magnitude selected from −1, 0, +1).

It should be understood that any number and type of data augmentation processes may be performed, with any appropriate number of degrees. Exemplary types of sound data augmentation include pitch shift, time stretch, low/high pass filters, overlapping noise sounds, temporal shift, decomposition of sounds into harmonic and percussive components, shuffling time series order of sound segments, averaging sounds, and spectral warping. While two types of data augmentation are shown, with three degrees each, to product a field of nine outputs, any number of data augmentation types may be used, with any appropriate number of degrees, to generate a set of augmented samples of any appropriate size. For example, a subset of four, five, or eight of the nine possible outputs may be implemented and used, as described in greater detail below.

Figure 2:
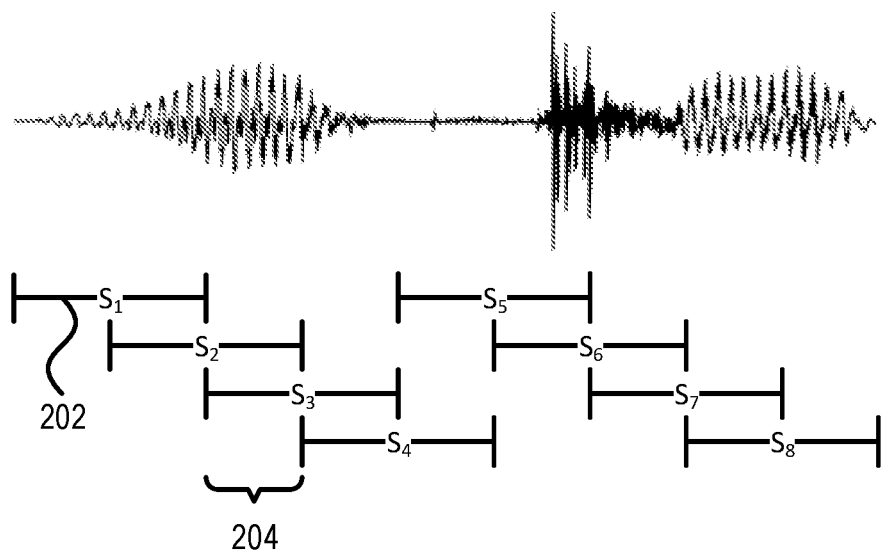
FIG. 2 is a diagram showing segmentation of an input waveform, in accordance with an embodiment of the present invention.

Referring now to FIG. 2, the augmented samples may be divided into a set of segments 202. It should be understood that segmentation may be performed before or after data augmentation. The segments 202 may all have a same length, or may have varying lengths. A starting time of each subsequent segment 202 may be separated from a starting time of a previous segment 202 by a hop size 204. Thus, the segments 202 may overlap with one another to varying degrees, according to the hop size 204. The segment length and the hop size are hyperparameters that can be tuned to maximize anomaly detection performance. As an example of one practical implementation, a sample size of ten seconds may have segment lengths of 2-3 seconds, with a 50% hop size ratio relative to the segment length.

The input sample 100 may be of any appropriate length, and one sample may vary in length from the next. Additionally, some types of data augmentation (e.g., time stretching) will affect the length of the sample. Using a consistent segment size helps to provide uniform samples to a classifier, regardless of the length of the input. Thus, for an input sample that is ten seconds long, data augmentation may produce a set of samples that vary from about 9 seconds to about 11 seconds. The segments 202 in this example may have a length of about three seconds, with a hop size of about one second. Thus, each of the augmented samples may have a different number of segments 202 associated with it.

Figure 3:
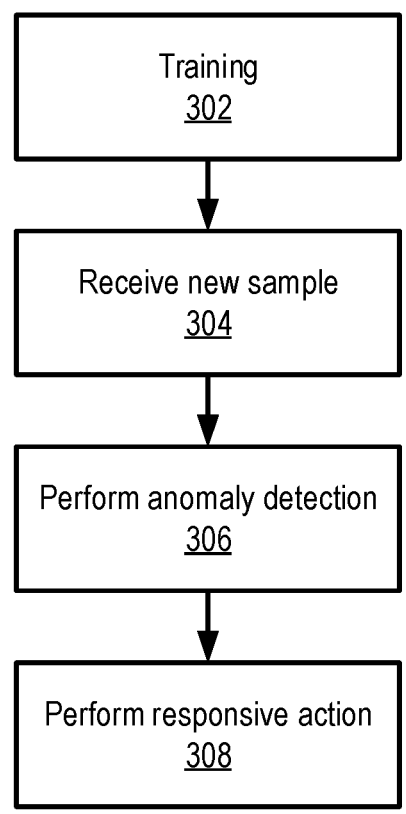
FIG. 3 is a block/flow diagram of a method of detecting an anomaly and performing a responsive action, in accordance with an embodiment of the present invention.

Referring now to FIG. 3, a method of detecting and responding to anomalous audio is shown. Training is performed in block 302. The training uses a machine learning model, such as one implemented by an artificial neural network (ANN). Training takes an input dataset, which includes a variety of "normal" sound samples and some "abnormal" sound samples, and performs N types of data augmentation on each sample. For the abnormal sound samples, incorrect labels are applied to improve the performance of the trained classifier. Each sample is broken into multiple sound segments. The segments are used to train the machine learning model.

While it is specifically contemplated that the dataset may include sound information that is recorded within the frequency range of human hearing, it should be understood that the present principles may be readily extended to non-audible pressure waves (e.g., ultrasonic sensor data or acoustic emission data), seismic information, biometric information (e.g., heart rate or brainwaves or breath sounds), vibration, accelerometer data, and any other kind of data that may be converted into a waveform. For example, recorded time series from sensors within a system may be expressed as a waveform, even though sound information may not be involved at all.

The machine learning model may include a set of classifiers, each being trained to recognize a respective data augmentation, or combination of data augmentations, and to output a corresponding probability. The probability reflects the likelihood that an input segment was augmented according to the respective combination of data augmentations. Thus, for example, a classifier that is trained to recognize segments that have undergone a pitch shift with degree −1, and a time stretch with degree +1, will provide a high probability output for normal segments that have undergone those data augmentations, but will provide a lower probability output for segments that have not.

The trained classifier for a particular set of data augmentations may also provide a lower probability output for input segments that actually have undergone the respective combination of data augmentations, but which were generated from anomalous sound data. This may occur, because the anomalous data may behave differently under the data augmentation, as compared to normal sound data. To increase the likelihood that such a mismatch may occur, a variety of different data augmentations and degrees of augmentation may be performed. The introduction of abnormal training data with incorrect labels enhances this effect.

The training in block 302 may divide the training dataset into a training subset and a validation subset. As will be described in greater detail below, the training dataset may be used in a backpropagation-style training process, where the machine learning mode's output is compared to an expected output for part of the training data, and error information is propagated back through the model to update it. Once training is completed, the model may further be evaluated against new training information from the validation subset, to evaluate whether the machine learning model has been trained with sufficient generality. The training of block 302 may be repeated and refined until accuracy in classifying the validation subset exceeds a threshold value.

Block 304 receives a new input audio sample. This sample may originate from any source. As with the training dataset, the input audio sample may be audible sound information, or may represent any appropriate waveform that matches the type of audio information used for training. Thus, the sample may originate from any source that is appropriate for recording the pertinent type of waveform, such as a microphone, seismograph, heartrate monitor, electroencephalogram, etc.

Block 306 performs anomaly detection on the new sample. The anomaly detection outputs an anomaly score for the sample, based on the degree to which data augmentation that is performed on the sample can be correctly classified, and will be described in greater detail below. Once an anomaly has been detected, block 308 performs a responsive action.

Anomaly detection may be used for a variety of applications, such as in equipment fault detection, product defect detection, network intrusion detection, fraud detection, medical diagnosis, and earthquake detection. The responsive action can be used to quickly and automatically respond to any such anomaly, providing a rapid response to new circumstances. For example, anomalies may indicate a product defect in a factory, in which case the faulty product can be diverted from the factory line and can be repaired. Anomalies may also indicate an equipment fault, in which case the factory line may be halted, to repair the equipment and prevent further damage. In some cases, where the anomaly may be addressed automatically, the responsive action may adjust operational parameters of a system to compensate, such as increasing a cooling action when an overheating condition is detected.

Figure 4:
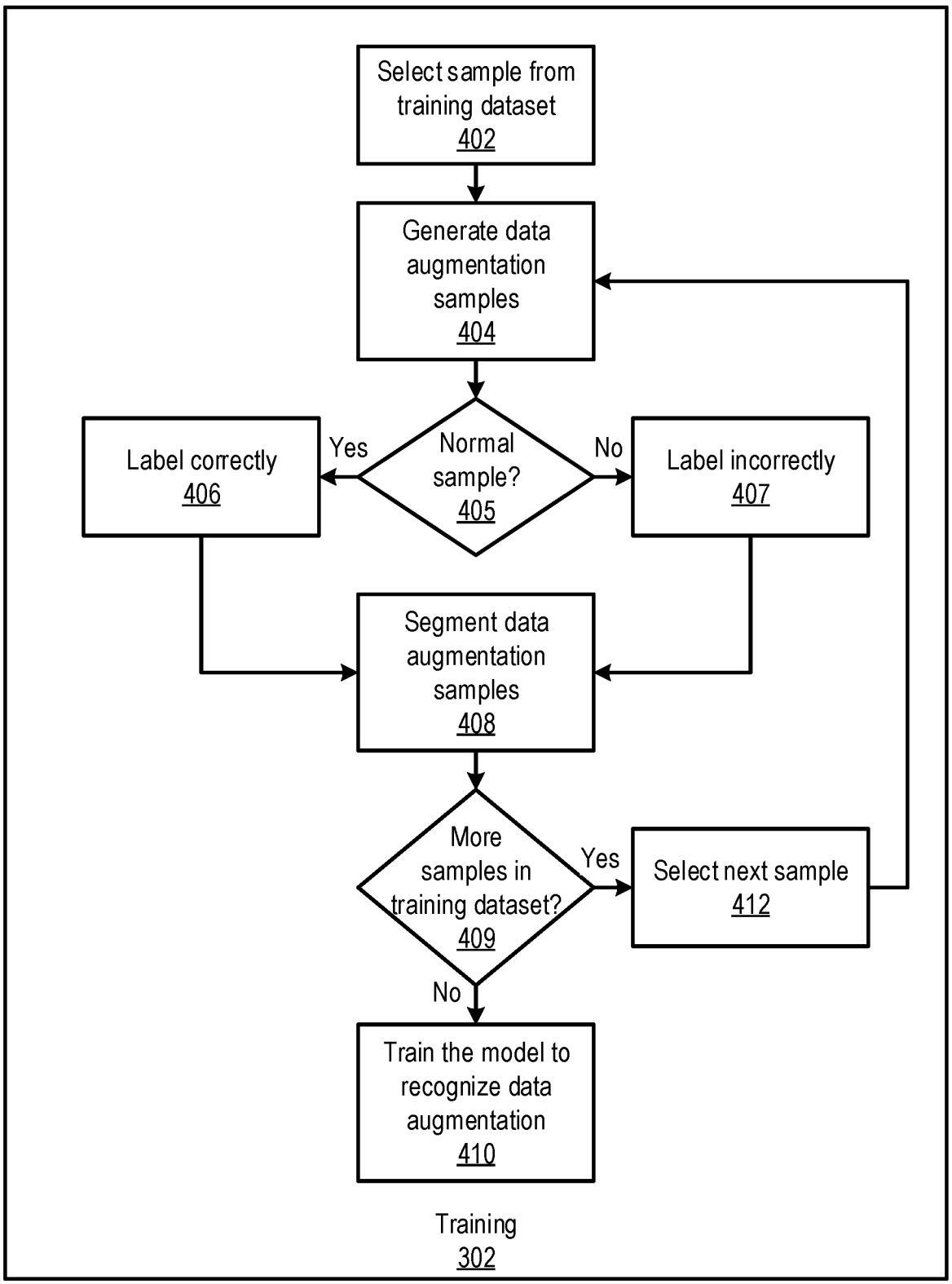
FIG. 4 is a block/flow diagram of a method of training a classifier to detect forms of data augmentation that are performed on waveform samples, in accordance with an embodiment of the present invention.

Referring now to FIG. 4, additional detail on training block 302 is shown. Block 402 selects an initial original sample from the training dataset. Block 404 then generates data augmentation samples from the original sample, for example by using different types of data augmentation, performed to different degrees. Each data augmentation sample is thus characterized by the types of data augmentation that are performed on it, and the respective degree of each type of data augmentation. One data augmentation sample may include a degree of zero for each type of data augmentation, and may thus be identical to the original sample.

Following the example of FIG. 1, where two distinct types of augmentation are performed, each having a possible value of {−1, 0, +1}, a total of nine different augmentation samples are possible for each original sample. In some cases, four samples (corresponding to the corner samples and omitting the original sample of FIG. 1), five samples (corresponding to the original sample and the corners of FIG. 1), eight samples (corresponding to the eight outer samples and omitting the original sample of FIG. 1), or nine samples (corresponding to all of the samples of FIG. 1) may be selected.

Block 405 determines whether the selected sample corresponds to "normal" operation or "abnormal" operation. If the sample is "normal," then block 406 correctly labels the data augmentation samples as to what types of data augmentation have been performed. If not, then block 407 incorrectly labels the data augmentation samples as to what types of data augmentation have been performed.

Block 408 then segments the data augmentation samples, for example using the hop size to step through each data augmentation sample and to select segments of a fixed length. Block 409 determines whether there are further original samples in the training dataset. If so, block 412 selects the next sample, and processing returns to block 404.

If there are no further original samples, the data augmentation segments are used by block 410 to train a machine learning model to recognize the types and degrees of data augmentation. Training may make use of a loss function to characterize the difference between the output of the model and the expected output of the model. The loss may include, for example, a softmax loss and a center loss, where the former characterizes descriptiveness, and the latter characterizes compactness. The loss function may thus be expressed as:

$$L = L_S + \lambda L_C$$

where $L_C$ is the softmax loss, $L_C$ is the center loss, and $\lambda$ is a parameter that determines a weight between the components of the loss. The center loss may be used to map normal input data to a minimized volume hyperspace in the latent feature space. In other examples, the loss function may be defined as $L = L_S$ alone.

The training is completed at block 414. The model may be tested against a validation dataset, and may be repeated if needed.

In some embodiments, the labeling of blocks 406 and 407 may be performed using the table of FIG. 1, where each of the different types of data augmentation may be assigned to a respective label. Thus, augmentation $102_a$, representing a pitch shift of −1 and a time stretch of −1 may have a distinct label from augmentation $102_h$, representing a pitch shift of +1 and a time stretch of +1. In some examples, the normal samples may be labeled in block 406 to reflect the actual augmentation performed, for example such that an augmentation of pitch shift +1 and time shift +1 would be labeled as $102_h$. In such examples, the abnormal samples may be labeled by block 407 with a label that is diametrically opposed to the actual augmentation performed. Thus, an abnormal sample that is augmented with a pitch shift +1 and time shift +1 may be labeled as $102_a$—the opposite square in FIG. 1. Similarly, an abnormal sample that has been augmented according to $102_d$ may be labeled as if the augmentation of $102_e$ had been performed.

Although the intentional mislabeling of block 407 is described with respect to the specific types of augmentation that are shown in FIG. 1, it should be understood that it may be extended to any form of augmentation. Thus, if a particular abnormal sample is augmented in a first manner, then it may be labeled as if it had been augmented in a second manner, opposite to the first manner. For abnormal samples that have no augmentation performed, they may be labeled accurately.

Other patterns of labeling for block 407 are also contemplated. For example, a "round robin" labeling may be used, where each abnormal sample is labeled as if the "next" type of augmentation had been performed. Following the example of FIG. 1, if an augmentation according to $102_a$ were performed on an abnormal sample, then the label of $102_b$ may be applied. In this example, each abnormal sample (including the samples with no augmentation applied) may be labeled according to a "next" augmentation, with any appropriate order of the augmentations being selected.

As an alternative to the intentional mislabeling of abnormal samples in block 407, the loss function may be modified to move abnormal samples away from the correct classification during the training of block 410. In some examples, the contribution of a normal samples to $L_S$ may add the cross entropy loss, while the contribution of abnormal samples may subtract the cross entropy loss. In other examples, for normal samples, $L_S = -\Sigma_{i=1}^{m} t_i \log p_i$, whereas for abnormal samples, $l_S = -\Sigma_{i=1}^{n} t_i \log(1-p_i)$, where m is the number of normal samples and n is the number of abnormal samples, $p_i$ is the softmax probability for $i^{th}$ sample, and $t_i$ is the given label for $i^{th}$ sample.

Figure 5:
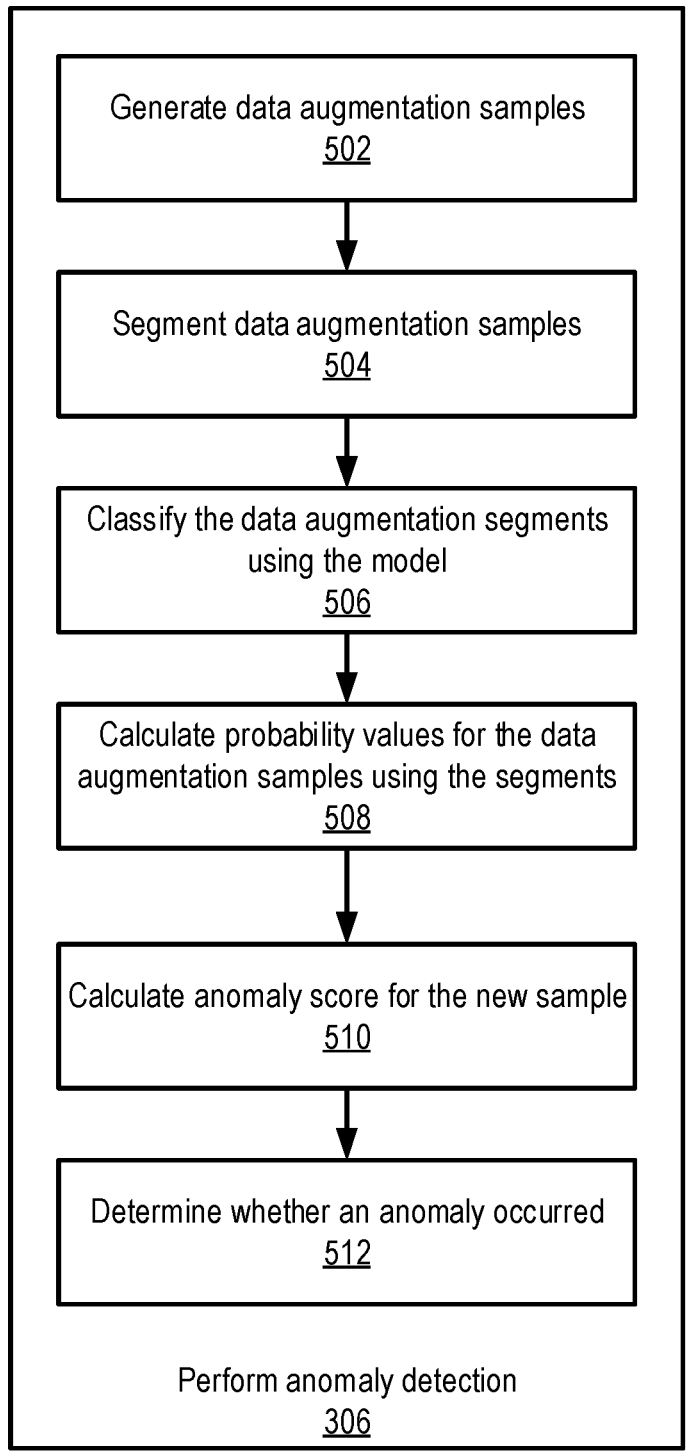
FIG. 5 is a block/flow diagram of a method of detecting anomalies using data augmentation classification, in accordance with an embodiment of the present invention.

Referring now to FIG. 5, additional detail on the anomaly detection of block 306 is shown. After the new sample is received in block 304, block 502 generates data augmentation samples from the new sample, for example using the same set of data augmentation types and degrees that were used to generate training data augmentation samples in block 404. In some cases, the data augmentation of block 502 need not replicate all of the data augmentation types and degrees used during training. For example, some data augmentation types or degrees may be skipped, to make the inference faster.

After the new data augmentation samples have been generated, block 504 then segments the new data augmentation samples, using the same hop size and segment length as was used to segment the training data augmentation samples in block 406. Segmenting the sample may improve anomaly detection, because an anomaly may occur in only a small part of a larger sample. Furthermore, dividing a sample into multiple segments increases the amount of training data that is available, which can improve the accuracy of a classifier.

Block 506 uses the trained model to classify the data augmentation segments into labels for normal samples used during the training phase. Each segment is classified according to the type and degree of data augmentation that was performed, with an associated probability score being generated for segment. For example, a softmax probability may be determined for each segment.

Block 508 then determines an average value over the probabilities of the segments of each respective new data augmentation sample. Thus, each new data augmentation sample will have an associated score that is the average of the probabilities of each of its component segments. Block 510 then determines an anomaly score for the new sample. For example, this score may be determined as:

$$s(x) = 1 - \frac{1}{k}\sum_{j=0}^{k-1}[y(T_j(x))]_j$$

where x is the new sample, $T_j(x)$ is the output of performing the $j^{th}$ combination of data augmentation types and degrees on the new sample x, $y(\cdot)$ is the output of the classifier that is used to determine what type and degree of data augmentation was performed on the new data augmentation sample, and k is a total number of combinations of data augmentation types and degrees. In particular, the value of $y(\cdot)$ may be the averaged probability of the segments for the data augmentation sample. For example, following the illustration of FIG. 1, k may be 9.

Once the anomaly score for the new sample has been determined by block 510, block 512 uses the anomaly score to determine whether the new sample represents an anomaly. For example, this may include comparing the anomaly score to a threshold value, with above-threshold anomaly scores indicating that an anomaly has occurred, and with at- or below-threshold anomaly scores indicating that no anomaly has occurred.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
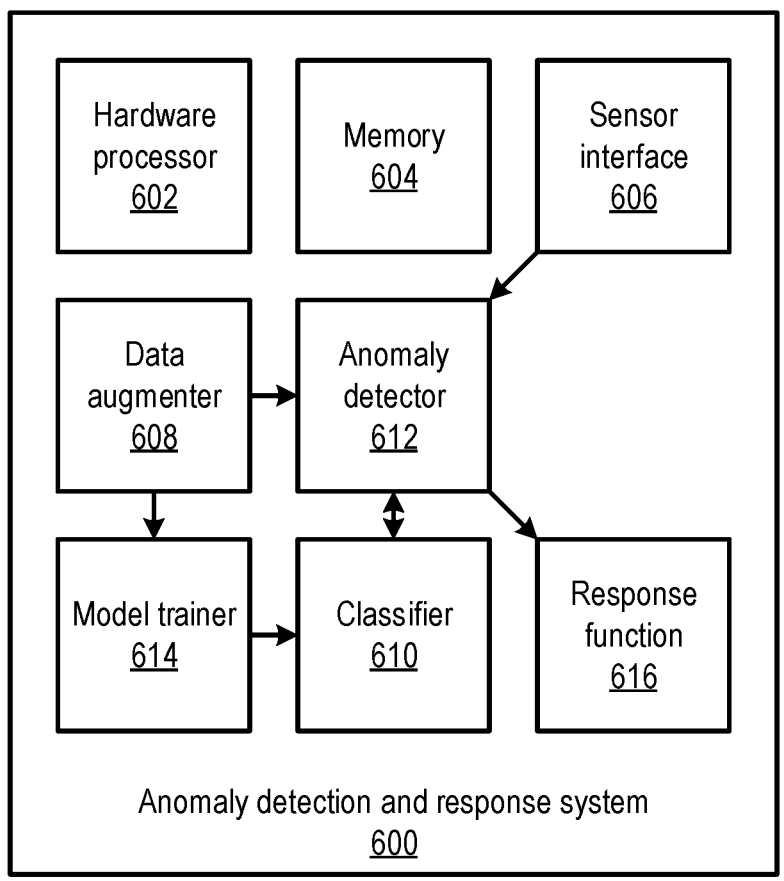
FIG. 6 is a block diagram of an anomaly detection and response system that uses data augmentation classification, in accordance with an embodiment of the present invention.

Referring now to FIG. 6, an anomaly detection and response system 600 is shown. The system 600 includes a hardware processor 602 and memory 604. A sensor interface 606 provides communications with one or more sensors that may, for example, include a microphone that collects audio data, or may alternatively be any sensor or combination of sensors that provide a waveform or time series output.

A classifier 610 is trained by a model trainer 614, and may be implemented as any appropriate machine learning model, such as an ANN. A data augmenter 608 is used by the model trainer 614 to perform data augmentation on each original sample waveform from a training dataset, for example using multiple types and degrees of data augmentation, to generate sets of data augmentation samples. The classifier 610 is trained to recognize the type and degree of data augmentation that has been applied to a given segment of a sample.

An anomaly detector 612 receives a new sample from the sensor interface 606 and uses the data augmenter 608 to generate data augmentation samples. The classifier 610 is then used to determine what type and degree of data augmentation was performed on each of the data augmentation samples, generating respective probabilities for each combination of augmentation type and degree. The anomaly detector uses these probabilities to generate an anomaly score for the new sample, and then uses the anomaly score to determine whether the new sample represents an anomaly.

A response function 616 is triggered by the detection of an anomaly. The response function 616 may include any appropriate action that corrects, reports, or otherwise addresses the detected anomaly.

Figure 7:
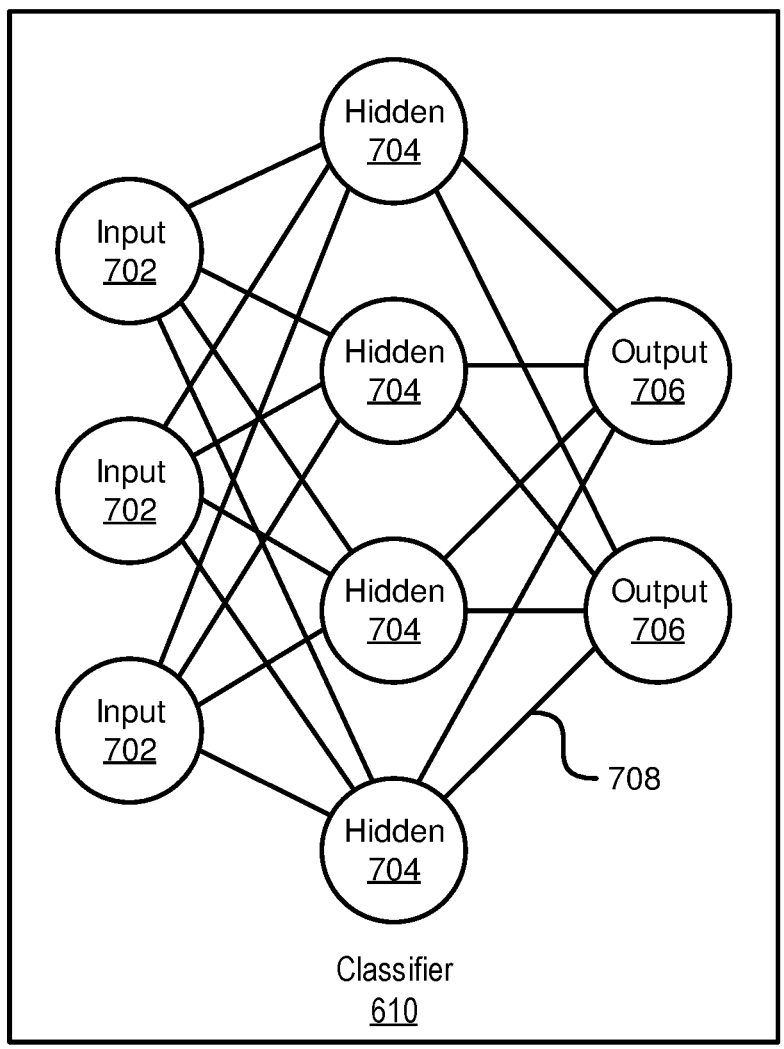
FIG. 7 is a high-level diagram of neural network layers that may be used in classifying data augmentation, in accordance with an embodiment of the present invention.

Referring now to FIG. 7, a generalized diagram of an ANN is shown. As noted above, the classifier 610 may be implemented as an ANN. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network is known generally to have input neurons 702 that provide information to one or more "hidden" neurons 704. Connections 708 between the input neurons 702 and hidden neurons 704 are weighted and these weighted inputs are then processed by the hidden neurons 704 according to some function in the hidden neurons 704, with weighted connections 708 between the layers. There can be any number of layers of hidden neurons 704, and as well as neurons that perform different functions. There exist different neural network structures as well, such as convolutional neural network, maxout network, etc. Finally, a set of output neurons 706 accepts and processes weighted input from the last set of hidden neurons 704.

This represents a "feed-forward" computation, where information propagates from input neurons 702 to the output neurons 706. Upon completion of a feed-forward computation, the output is compared to a desired output available from training data. The error relative to the training data is then processed in "feed-back" computation, where the hidden neurons 704 and input neurons 702 receive information regarding the error propagating backward from the output neurons 706. Once the backward error propagation has been completed, weight updates are performed, with the weighted connections 708 being updated to account for the received error. This represents just one variety of ANN.

Figure 8:
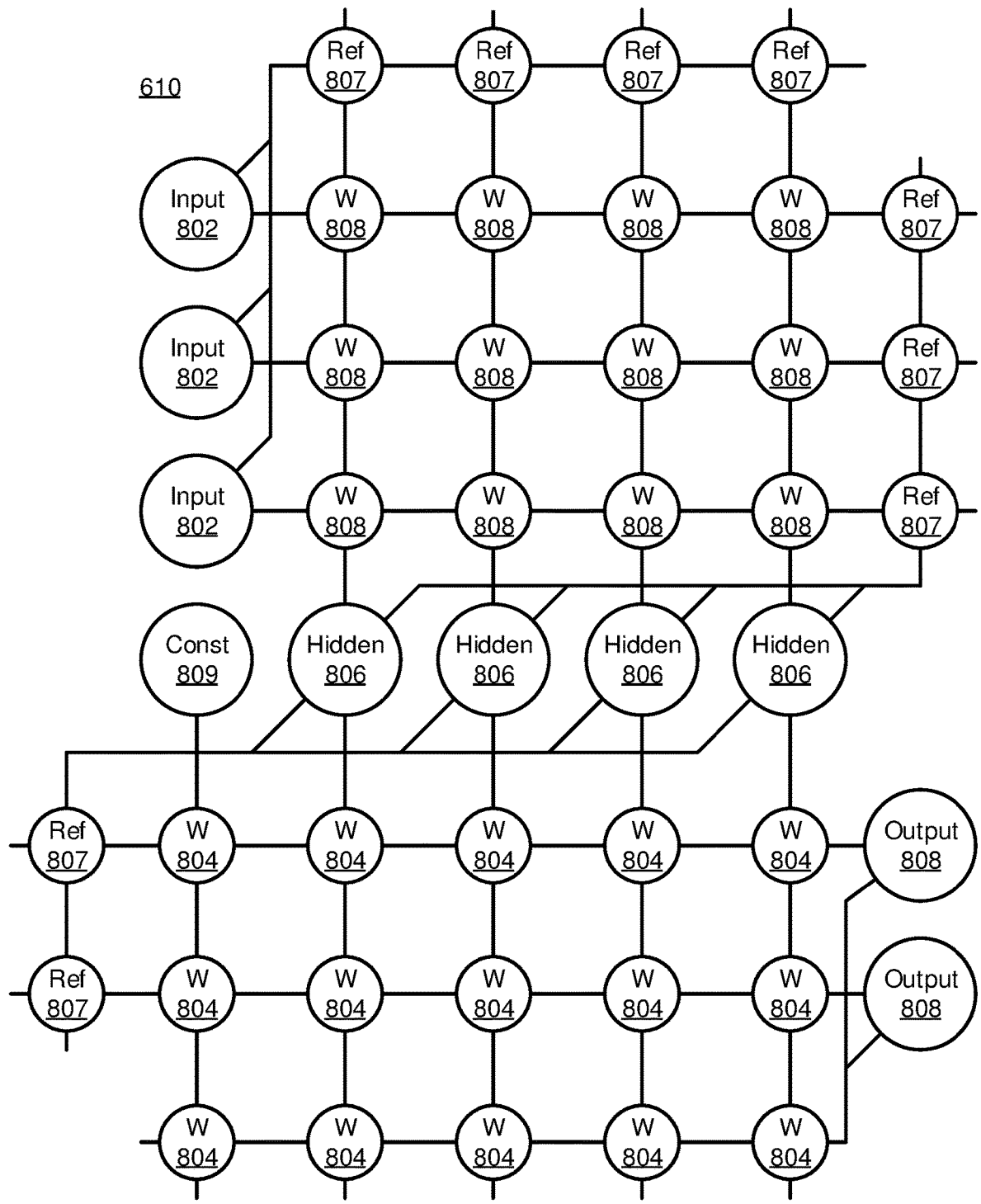
FIG. 8 is a diagram of a neural network architecture that may be used in classifying data augmentation, in accordance with an embodiment of the present invention.

Referring now to FIG. 8, an exemplary ANN architecture for the classifier 610 is shown, corresponding to the generalized structure of FIG. 7. It should be understood that the present architecture is purely exemplary, and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 802 each provide an input voltage in parallel to a respective row of weights 804. In the hardware embodiment described herein, the weights 804 each have a settable resistance value, such that a current output flows from the weight 804 to a respective hidden neuron 806 to represent the weighted input. In software embodiments, the weights 804 can simply be represented as coefficient values that are multiplied against the relevant neuron outputs.

Following the hardware embodiment, the current output by a given weight 804 is determined as $$I = \frac{V}{r},$$

where V is the input voltage from the input neuron 802 and r is the set resistance of the weight 804. The current from each weight adds column-wise and flows to a hidden neuron 806. A set of reference weights 807 have a fixed resistance and combine their outputs into a reference current that is provided to each of the hidden neurons 806. Because conductance values can only be positive numbers, some reference conductance is needed to encode both positive and negative values in the matrix. The currents produced by the weights 804 are continuously valued and positive, and therefore the reference weights 807 are used to provide a reference current, above which currents are considered to have positive values and below which currents are considered to have negative values. The use of reference weights 807 is not needed in software embodiments, where the values of outputs and weights can be precisely and directly obtained. As an alternative to using the reference weights 807, another embodiment can use separate arrays of weights 804 to capture negative values.

The hidden neurons 806 use the currents from the array of weights 804 and the reference weights 807 to perform some calculation. The hidden neurons 806 then output a voltage of their own to another array of weights 804. This array performs in the same way, with a column of weights 804 receiving a voltage from their respective hidden neuron 806 to produce a weighted current output that adds row-wise and is provided to the output neuron 808.

It should be understood that any number of these stages can be implemented, by interposing additional layers of arrays and hidden neurons 806. It should also be noted that some neurons can be constant neurons 809, which provide a constant output to the array. The constant neurons 809 can be present among the input neurons 802 and/or hidden neurons 806 and are only used during feed-forward operation.

During back propagation, the output neurons 808 provide a voltage back across the array of weights 804. The output layer compares the generated network response to training data and computes an error. The error is applied to the array as a voltage pulse, where the height and/or duration of the pulse is modulated proportional to the error value. In this example, a row of weights 804 receives a voltage from a respective output neuron 808 in parallel and converts that voltage into a current which adds column-wise to provide an input to hidden neurons 806. The hidden neurons 806 combine the weighted feedback signal with a derivative of its feed-forward calculation and stores an error value before outputting a feedback signal voltage to its respective column of weights 804. This back propagation travels through the entire network 800 until all hidden neurons 806 and the input neurons 802 have stored an error value.

During weight updates, the input neurons 802 and hidden neurons 806 apply a first weight update voltage forward and the output neurons 808 and hidden neurons 806 apply a second weight update voltage backward through the network 800. The combinations of these voltages create a state change within each weight 804, causing the weight 804 to take on a new resistance value. In this manner the weights 804 can be trained to adapt the neural network 800 to errors in its processing. It should be noted that the three modes of operation, feed forward, back propagation, and weight update, do not overlap with one another.

As noted above, the weights 804 can be implemented in software or in hardware, for example using relatively complicated weighting circuitry or using resistive cross point devices. Such resistive devices can have switching characteristics that have a non-linearity that can be used for processing data. The weights 804 can belong to a class of device called a resistive processing unit (RPU), because their non-linear characteristics are used to perform calculations in the neural network 800. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 9:
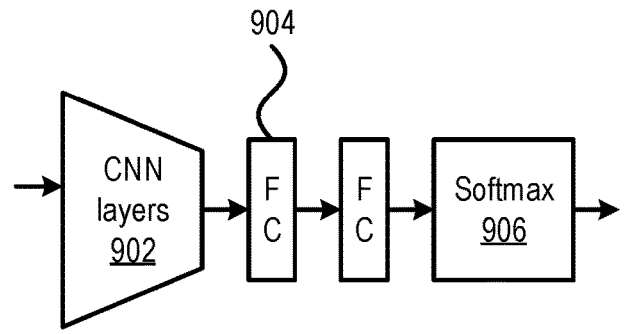
FIG. 9 is a diagram of a neural network classifier that may be used to classify data augmentation in waveform samples, in accordance with an embodiment of the present invention.

Referring now to FIG. 9, an exemplary structure for a classifier is shown. For implementations that include two types of data augmentation, with three degrees possible for each type, the classifier may be a nine-class classifier. The input may be a spectrogram of sound segment, with the output being a confidence value for each augmentation type. The input may be provided to one or more convolutional neural network (CNN) layers 902. The output of the CNN layers 902 is provided to fully connected layers 904. A softmax layer 906 then generates the confidence values.

In more detail, the layers may be implemented as follows:
Input: Log Mel Spectrogram (ch, freq, time)
CNN[64, k=(7,1)]+BN+ReLU
Max pooling[k=(4,1)]+Dropout(0.2)
CNN[128, k=(10,1)]+BN+ReLU
CNN[256, k=(1,7)]+BN+ReLU
Global max pooling (ch-axis)+Dropout(0.5)
Dense(128)
Dense(class)+Softmax In the above, "BN" refers to batch normalization, ReLU refers to a rectified linear unit, "max pooling" refers to pooling layers for CNNs, "dropout" refers to a dropout layer, "dense" refers to a densely connected layer, and "Softmax" refers to a softmax layer.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
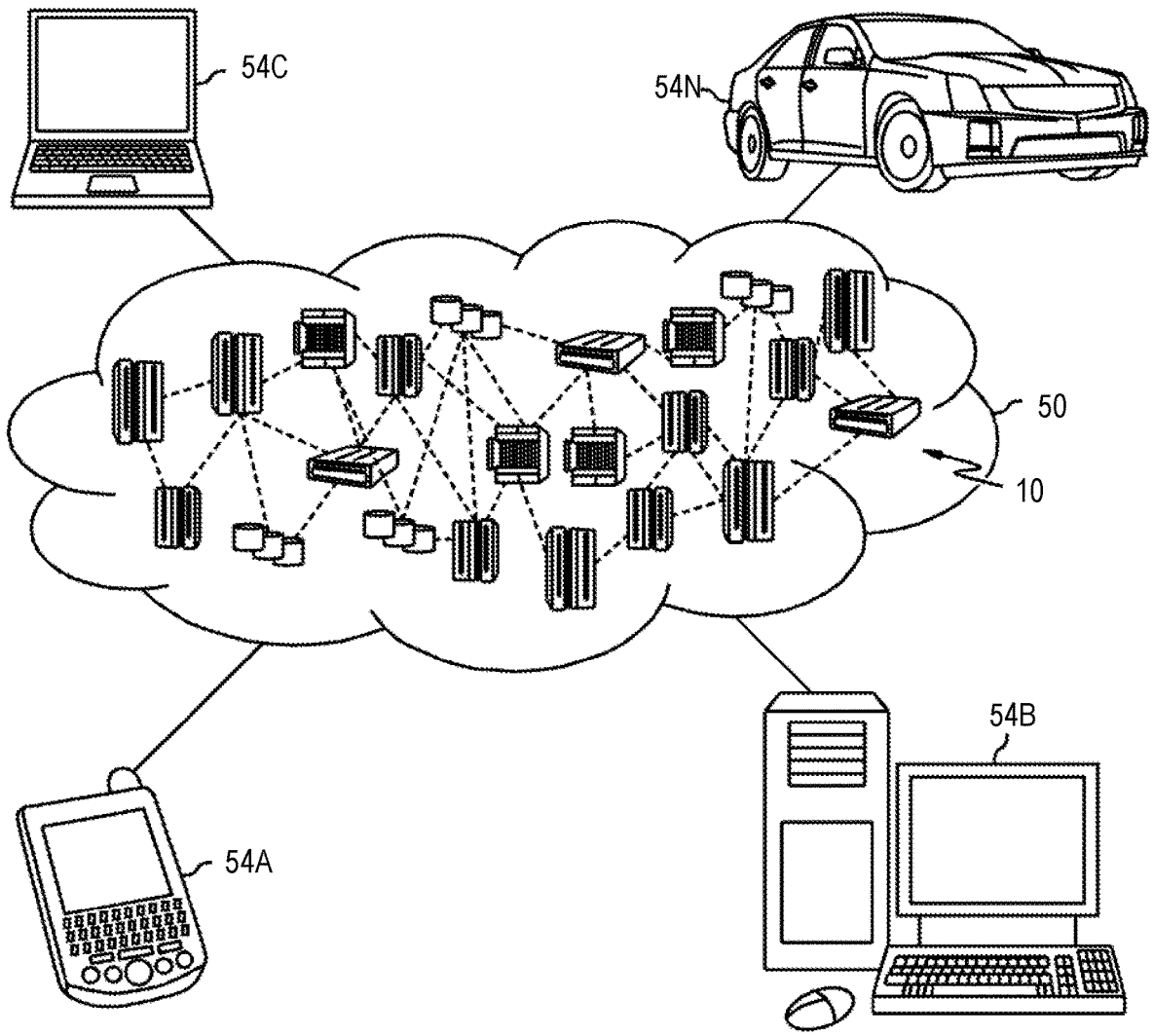
FIG. 10 is a block diagram showing an illustrative cloud computing environment having one or more cloud computing nodes with which local computing devices used by cloud consumers communicate in accordance with one embodiment.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
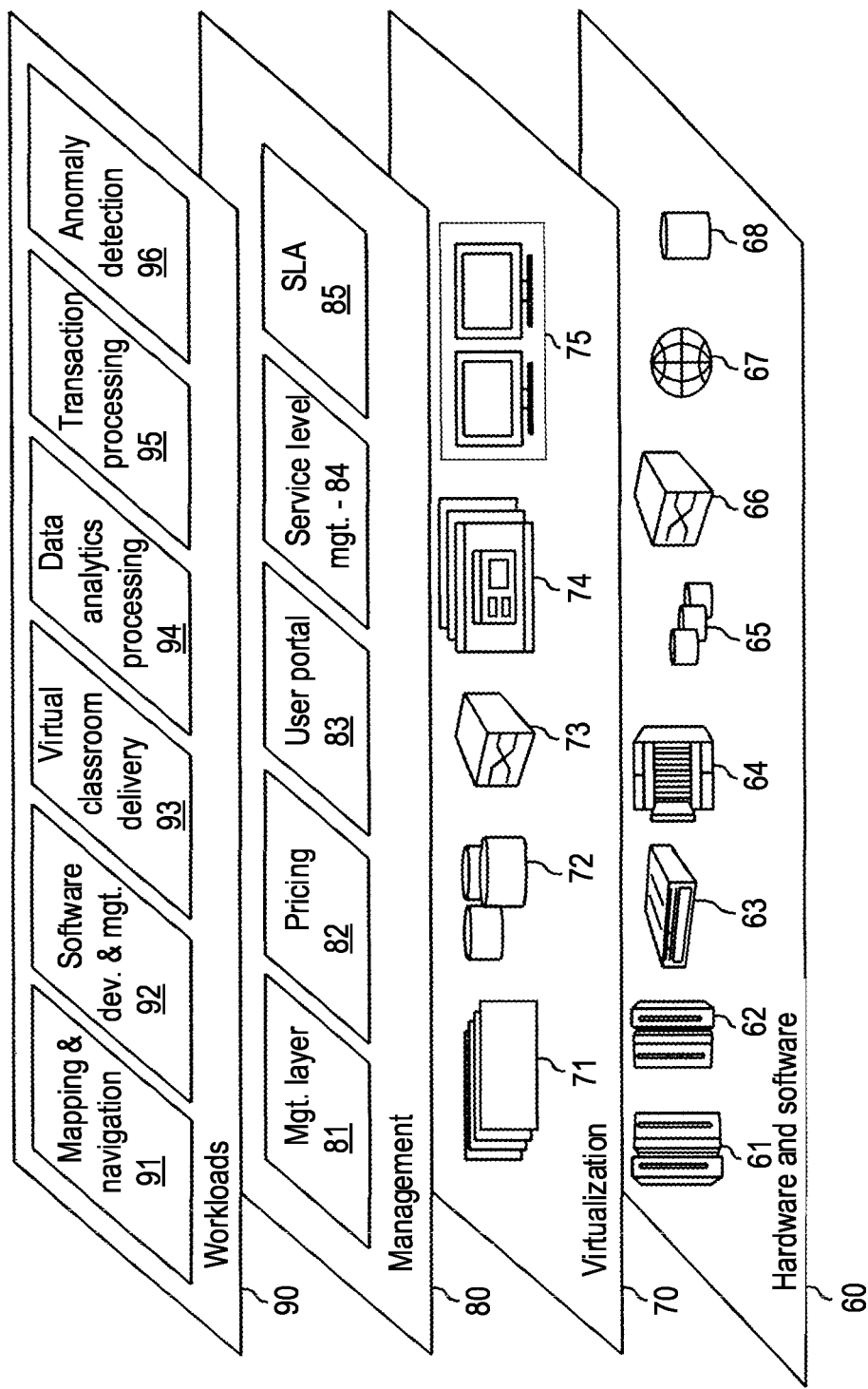
FIG. 11 is a block diagram showing a set of functional abstraction layers provided by a cloud computing environment in accordance with one embodiment.

Referring now to FIG. 11, a set of functional abstraction layers provided by cloud computing environment 50 (FIG. 10) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Having described preferred embodiments of sound anomaly detection with mixed augmented datasets (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for training a neural network, the computer program product comprising a computer readable storage medium having program instructions embodied therewith, the program instructions executable by a hardware processor to cause the hardware processor to:
   perform multiple forms of data augmentation on sample waveforms of a training dataset that includes both normal and abnormal samples to generate normal data augmentation samples and abnormal data augmentation samples;
   label the normal data augmentation samples to reflect a type of data augmentation that was performed on each respective normal data augmentation sample;
   label the abnormal data augmentation samples according to a type of data augmentation other than that which was performed on each respective abnormal data augmentation sample; and
   train a neural network model to identify a form of data augmentation that has been performed on a waveform using the normal data augmentation samples and the abnormal data augmentation samples.

2. The computer program product of claim 1, wherein the multiple forms of data augmentation include one or more types of data augmentation selected from the group consisting of pitch shift, time stretch, low/high pass filters, overlapping noise sounds, temporal shift, decomposition of sounds into harmonic and percussive components, shuffling time series order of sound segments, averaging sounds, and spectral warping.

3. The computer program product of claim 1, wherein the multiple forms of data augmentation include differing degrees of a single type of data augmentation.

4. The computer program product of claim 3, wherein the multiple forms of data augmentation include at least two distinct types of data augmentation.

5. The computer program product of claim 4, wherein each form of data augmentation is performed to at least three different degrees, to provide at least eight different forms of combined data augmentation.

6. The computer program product of claim 4, wherein each form of data augmentation is performed to at least two different degrees, to provide at least four different forms of combined data augmentation.

7. The computer program product of claim 4, wherein the multiple forms of data augmentation include an original dataset sample.

8. The computer program product of claim 1, wherein the sample waveform is selected from the group consisting of an audio waveform, an accelerometer waveform, a vibrational waveform, a non-audible pressure waveform, a seismic waveform, and a biometric waveform.

9. The computer program product of claim 1, wherein the normal samples are recorded from a system behaving normally and the abnormal samples are recorded from a system behaving abnormally for sound anomaly detection to identify equipment fault in the system and autonomously adjust parameters of the system to compensate for the equipment fault.

10. A computer-implemented method for training a neural network, comprising:
performing multiple forms of data augmentation on sample waveforms of a training dataset that includes both normal and abnormal samples to generate normal data augmentation samples and abnormal data augmentation samples;
labeling the normal data augmentation samples to reflect a type of data augmentation that was performed on each respective normal data augmentation sample;
labeling the abnormal data augmentation samples according to a type of data augmentation other than that which was performed on each respective abnormal data augmentation sample; and
training a neural network model to identify a form of data augmentation that has been performed on a waveform using the normal data augmentation samples and the abnormal data augmentation samples.

11. The method of claim 10, wherein the multiple forms of data augmentation include one or more types of data augmentation selected from the group consisting of pitch shift, time stretch, low/high pass filters, overlapping noise sounds, temporal shift, decomposition of sounds into harmonic and percussive components, shuffling time series order of sound segments, averaging sounds, and spectral warping.

12. The method of claim 10, wherein the multiple forms of data augmentation include differing degrees of a single type of data augmentation.

13. The method of claim 12, wherein the multiple forms of data augmentation include at least two distinct types of data augmentation, each performed to at least three different degrees, to provide at least nine different forms of combined data augmentation.

14. The method of claim 10, wherein the sample waveform is selected from the group consisting of an audio waveform, an accelerometer waveform, a vibrational waveform, a non-audible pressure waveform, a seismic waveform, and a biometric waveform.

15. The method of claim 10, wherein the normal samples are recorded from a system behaving normally and the abnormal samples are recorded from a system behaving abnormally for sound anomaly detection to identify equipment fault in the system and autonomously adjust parameters of the system to compensate for the equipment fault.

16. A computer program product for training a neural network, the computer program product comprising a computer readable storage medium having program instructions embodied therewith, the program instructions executable by a hardware processor to cause the hardware processor to:
perform multiple forms of data augmentation on sample waveforms of a training dataset that includes both normal and abnormal samples to generate normal data augmentation samples and abnormal data augmentation samples; and
train a neural network model to identify a form of data augmentation that has been performed on a waveform using the normal data augmentation samples and the abnormal data augmentation samples, wherein the abnormal data augmentation samples contribute to a training loss function differently as compared to the normal data augmentation samples by moving abnormal samples away from a correct classification.

17. The computer program product of claim 16, wherein the normal data augmentation samples contribute to the loss function as $-\Sigma_{i=1}^{m} t_i \log p_i$ and the abnormal data augmentation samples contribute to the loss function as $-\Sigma_{i=1}^{n} t_i \log(1-p_i)$, where m is the number of normal samples and n is the number of abnormal samples, $p_i$ is the softmax probability for $i^{th}$ sample, and $t_i$ is the given label for $i^{th}$ sample.

18. The computer program product of claim 16, wherein the normal data augmentation samples add to a cross entropy loss and the abnormal data augmentation samples subtract from the cross entropy loss.

19. The computer program product of claim 16, wherein the multiple forms of data augmentation include one or more types of data augmentation selected from the group consisting of pitch shift, time stretch, low/high pass filters, overlapping noise sounds, temporal shift, decomposition of sounds into harmonic and percussive components, shuffling time series order of sound segments, averaging sounds, and spectral warping.

20. The computer program product of claim 16, wherein the normal samples are recorded from a system behaving normally and the abnormal samples are recorded from a system behaving abnormally for sound anomaly detection to identify equipment fault in the system and autonomously adjust parameters of the system to compensate for the equipment fault.

* * * * *